US009058458B2

(12) United States Patent
Shapiro et al.

(10) Patent No.: US 9,058,458 B2
(45) Date of Patent: Jun. 16, 2015

(54) STRUCTURE FOR LOGIC CIRCUIT AND SERIALIZER-DESERIALIZER STACK

(71) Applicant: International Business Machines Corporation, Armonk, NY (US)

(72) Inventors: Michael J. Shapiro, Austin, TX (US); William F. Van Duyne, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/151,331

(22) Filed: Jan. 9, 2014

(65) Prior Publication Data

US 2015/0113495 A1   Apr. 23, 2015

Related U.S. Application Data

(63) Continuation of application No. 14/056,054, filed on Oct. 17, 2013.

(51) Int. Cl.
*H01L 21/44* (2006.01)
*G06F 17/50* (2006.01)

(52) U.S. Cl.
CPC ........ *G06F 17/5072* (2013.01); *G06F 2217/02* (2013.01); *G06F 2217/06* (2013.01); *G06F 2217/08* (2013.01); *G06F 2217/38* (2013.01); *G06F 2217/40* (2013.01); *G06F 2217/64* (2013.01)

(58) Field of Classification Search
CPC ............ H01L 23/5389; G06F 17/5072; G06F 2217/02
USPC ................................. 438/667, 672
See application file for complete search history.

(56) References Cited

U.S. PATENT DOCUMENTS 7,402,897 B2   7/2008 Leedy
7,459,772 B2 *  12/2008 Speers .......................... 257/686
7,701,252 B1   4/2010 Chow et al.
(Continued)

OTHER PUBLICATIONS

Lim et al., "ASIC Package Design Optimization for 10 Gbps and Above Backplane SerDes Links", 2012 IEEE International Symposium on Electromagnetic Compatability (EMC), pp. 199-204, © 2012 IEEE. DOI: 10.1109/ISEMC.2012.6351784.
(Continued)

*Primary Examiner* — Luan C Thai
(74) *Attorney, Agent, or Firm* — Peder M. Jacobson; Thomas E. Tyson

(57) ABSTRACT

Serializer-deserializer (SERDES) and integrated circuit package including a package substrate, first and second SERDES dies having a SERDES circuit, and a logic die having a logic circuit. The SERDES circuit communicatively connected to the package substrate. The first and second SERDES dies positioned adjacent, in a plane, and disposed on the package substrate. The logic circuit communicatively connected to the SERDES circuit and to the package substrate. The logic die stacked vertically and disposed on the first and second SERDES dies. A method of assembling a SERDES and integrated circuit package including providing a SERDES structure selected from a menu of SERDES die and SERDES circuit combinations. A design structure of a SERDES and integrated circuit package including a package substrate, first and second SERDES dies having a SERDES circuit, and a logic die having a logic circuit. The SERDES circuit communicatively connected to the package substrate.

4 Claims, 5 Drawing Sheets

(56) References Cited

U.S. PATENT DOCUMENTS

| | | |
|---|---|---|
| 7,834,450 B2 | 11/2010 | Kang |
| 7,999,367 B2 * | 8/2011 | Kang et al. .................... 257/686 |
| 8,368,217 B2 | 2/2013 | Miller et al. |
| 8,390,035 B2 | 3/2013 | Bemanian et al. |
| 2009/0039492 A1 | 2/2009 | Kang et al. |
| 2009/0052218 A1 | 2/2009 | Kang |
| 2011/0278737 A1 | 11/2011 | Yazdani |
| 2012/0294058 A1 | 11/2012 | Best et al. |

OTHER PUBLICATIONS

Shapiro et al., "Design Structure for Logic Circuit and Serializer-Deserializer Stack", U.S. Appl. No. 14/056,054, filed Oct. 17, 2013.

* cited by examiner

STRUCTURE FOR LOGIC CIRCUIT AND SERIALIZER-DESERIALIZER STACK

CROSS-REFERENCE TO RELATED APPLICATIONS

This application is a continuation of co-pending U.S. patent application Ser. No. 14/056,054, filed Oct. 17, 2013. The aforementioned related patent application is herein incorporated by reference in its entirety.

BACKGROUND

The present disclosure relates to the field of a design structure for integrated circuit stacks. More specifically, the present disclosure relates to a design structure for logic dies and serializer-deserializer (SERDES) dies communicatively connected and stacked on a package substrate.

In general, integrated circuits may employ SERDES devices in order to convert inputs/outputs between parallel and serial interfaces and decrease the number of input/output pins and interconnects. As the speed of integrated circuits increases, the number of SERDES devices employed by integrated circuits increases and the need to optimally design and configure integrated circuit and SERDES devices communicatively connected similarly increases.

SUMMARY

The present disclosure is directed to a design structure for a serializer-deserializer (SERDES) and integrated circuit package. The SERDES and integrated circuit package may include a package substrate, a first SERDES die having a first SERDES circuit, a second SERDES die having a second SERDES circuit, and a logic die having a logic circuit. The SERDES circuit may be communicatively connected to the package substrate. The first and second SERDES dies may be positioned adjacent, in a plane, and disposed on the package substrate. The logic circuit may be communicatively connected to at least one of the first and second SERDES circuits and to the package substrate. The logic die may be stacked vertically and disposed on at least the first and second SERDES dies.

The SERDES and integrated circuit package may also include a through silicon via placed in at least the first or second SERDES die. The logic circuit and the package substrate may be communicatively connected through the through silicon via. The logic die having the logic circuit may be aligned to the SERDES die having the SERDES circuit to which the logic circuit is communicatively connected. The logic die may have a die area, the first and second SERDES dies positioned adjacent in the plane may have a base area, and the base area may be at least as large as the die area. The first SERDES die and the second SERDES die may have a distinct configuration of the SERDES circuits.

The SERDES and integrated circuit package may also include a filler die. The filler die may be positioned adjacent to the first and second SERDES dies, in the plane, and disposed on the package substrate. The logic die may have a die area, the filler die and the first and second SERDES dies positioned adjacent in the plane may have a base area, and the base area may be at least as large as the die area.

The SERDES and integrated circuit package may also include a through silicon via placed in the filler die. The one or more logic circuits and the package substrate may communicatively connect through the through silicon via. The SERDES circuits may be configured to, when in operation, transmit and receive data from the logic circuit. The SERDES circuits and the package substrate may be communicatively connected through flip chips. The logic circuit may also be one or more selected from the group consisting of digital circuits, radio frequency circuits, application specific integrated circuits, and field programmable date arrays.

A method of assembling a SERDES and integrated circuit package may include providing a logic die having a logic circuit, providing a SERDES structure of at least a first SERDES die having a first SERDES circuit and a second SERDES die having a second SERDES circuit, stacking the logic die vertically on the SERDES structure and the SERDES structure vertically on a package substrate, and communicatively connecting at least one of the first and second SERDES circuits to transmit and receive data in parallel from the logic circuit and to transmit and receive data in serial from a package substrate. The SERDES structure may be selected from a menu of SERDES circuit and SERDES die combinations.

The SERDES structure selected from the menu may be determined at least based on a communication protocol of one or more of the first and second SERDES circuits. The SERDES structure may have a base area and the logic die may have a die area. The SERDES structure may be selected from the menu determined at least based on providing a base area at least as large as the die area. The first and second SERDES circuits may be configured to transmit and receive data in parallel and serial from the logic circuit. The package substrate may also be selected from the menu and which package substrate is selected may be determined at least based on the type of package.

A design structure readable by a machine used in design, manufacture, or simulation of an integrated circuit, the design structure may include a package substrate, first and second SERDES dies, each having a SERDES circuit, and a logic die having a logic circuit. The SERDES circuit may be communicatively connected to the package substrate. The first and second SERDES dies may be positioned adjacent, in a plane, and disposed on the package substrate. The logic circuit may be communicatively connected to the SERDES circuit and to the package substrate. The logic die may be stacked vertically and disposed on the first SERDES die. The design structure may be a netlist. The design structure of claim may reside on storage medium as a data format used for the exchange of layout data of integrated circuits. The design structure may also reside in a programmable gate array.

DETAILED DESCRIPTION

Figure 1:
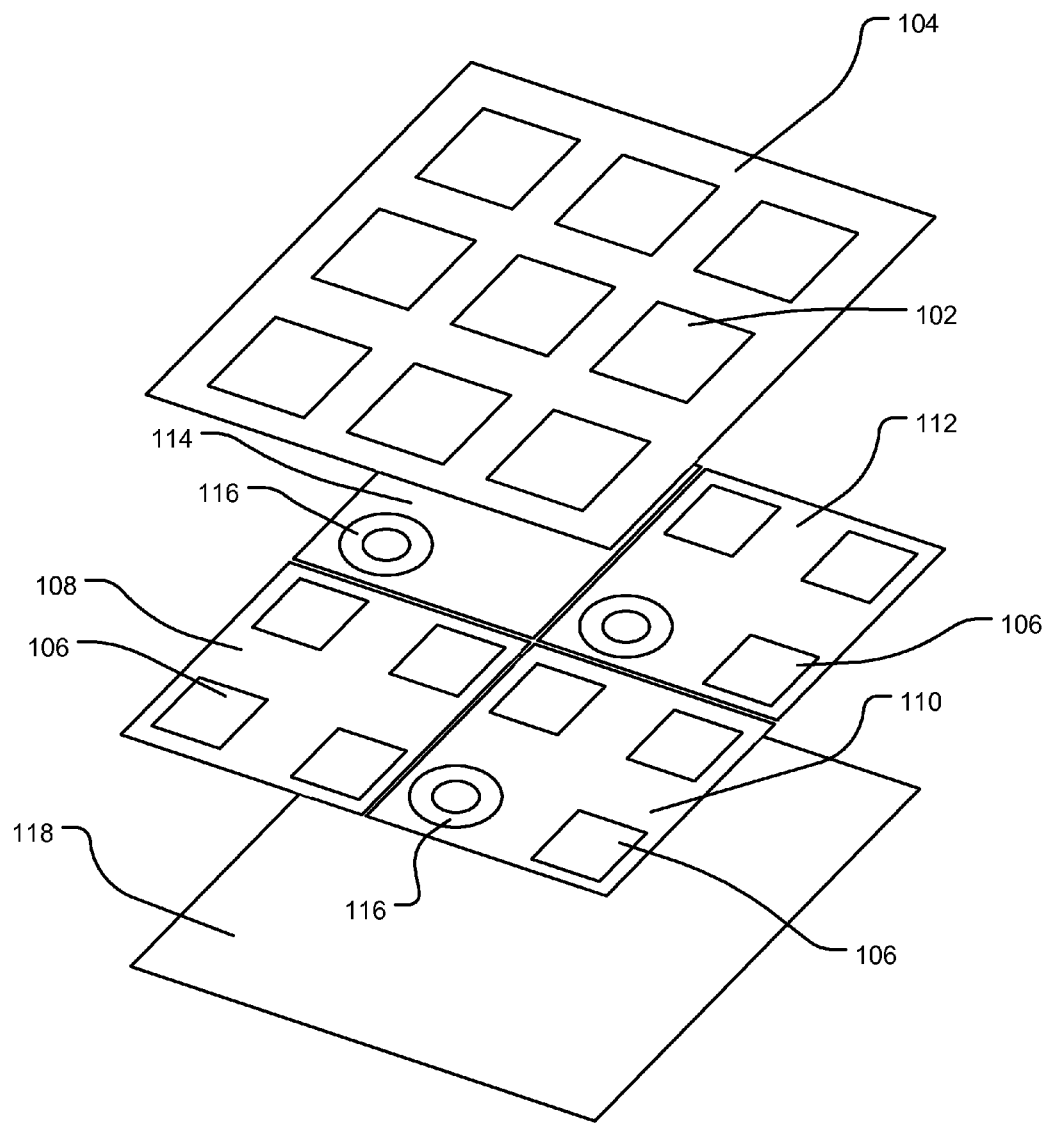
FIG. 1 is an exploded view of an embodiment of a SERDES and integrated circuit package having a logic elements, SERDES elements, a filler die and a package substrate.

In the following description, reference is made to the accompanying drawings which show by way of illustration various examples by which the disclosure may be used. Other examples of the disclosure may be used, as structural and operational changes may be made without departing from the scope of the present disclosure.

While the same nomenclature and same numbers may be used to identify elements throughout the disclosure, this practice is not intended to limit the scope of the disclosure. Identified elements in one figure may not be identical to other same named or identified elements in other figures.

The present disclosure relates to stacked serializer-deserializer (SERDES) and integrated circuit packages. Specifically, the disclosure relates to stacked integrated circuit packages which utilize logic circuits and SERDES circuits. The logic circuits may utilize the SERDES circuits in order to transmit and/or receive various inputs/outputs from the logic circuits. The SERDES circuits may be placed on a SERDES die and the logic circuits may be placed on a logic die. The logic die may be stacked vertically on the SERDES die and the SERDES die may be disposed on the package substrate. There may be one or more SERDES dies which may be placed adjacent to one another and in a plane to form a base area. The base area may be at least as large as the logic die. The one or more SERDES dies may have alternative configurations of SERDES circuits and may be configured depending upon the application of the logic circuits.

Aspects of the present disclosure are directed toward high speed logic circuit design. High speed logic circuits, including application specific integrated circuits, may employ a configuration of SERDES circuits and logic circuits communicatively connected together on a die. The SERDES circuits may be used to convert data between serial and parallel interfaces in each direction to facilitate communication to and from the log circuits. By converting data between serial and parallel SERDES circuits may provide data transmission over a single or differential line and may decrease the number of input/output pins and interconnects required for a logic circuit package. SERDES circuits may be capable of data conversion can take place in both directions simultaneously. As an example of these functions, SERDES circuits may facilitate the transmission of parallel data between two points over serial streams, which may reduce the number of data paths and lower the number of pins required.

The logic circuits may also employ a custom configuration of SERDES circuits on a die depending on the logic circuits used. In order to match the high speed bandwidth applications of some logic circuits, a plurality of SERDES circuits may be coupled to the logic circuits. SERDES circuits may be larger than the logic circuits, so customization of the die may be complex and the number of SERDES circuits on a die may leave less room remaining on the die for routing, logic circuits memory, or other elements. Stacking a logic die having logic circuits upon a SERDES die having SERDES circuits may allow for decoupling of SERDES circuits and logic circuits from the same die. Decoupling the SERDES and logic circuits may increase room for routing, logic circuits and memory on the logic die, and may allow for a menu of reusable configurations of SERDES die and SERDES circuits which may decrease complexity of customization for logic circuits when creating a circuit package.

The SERDES and integrated circuit package may include a package substrate, a logic die, a first SERDES die, and a second SERDES die. The logic die may have a logic circuit. The first SERDES die may have a first SERDES circuit and the second SERDES die may have a second SERDES circuit. One or more of the SERDES circuits may be communicatively connected to the package substrate and to the logic circuit. The first and second SERDES dies may be disposed on the package substrate and positioned adjacent to one another in a plane. The logic circuit may be communicatively connected at least one SERDES circuit and may also be communicatively connected to the package substrate. The logic die may be stacked vertically and disposed on the first and second SERDES die. The stack may also include a filler die placed adjacent and in the plane with the SERDES dies and may increase the size of the base area.

Referring now to FIG. 1, an embodiment can be seen including logic circuits 102 placed on a logic die 104, SERDES circuits 106 placed on a first SERDES die 108, second SERDES die 110, and third SERDES die 112, hereinafter referred to as SERDES dies 108, 110, 112, a filler die 114, through silicon vias 116, and a package substrate 118.

Figure 2:
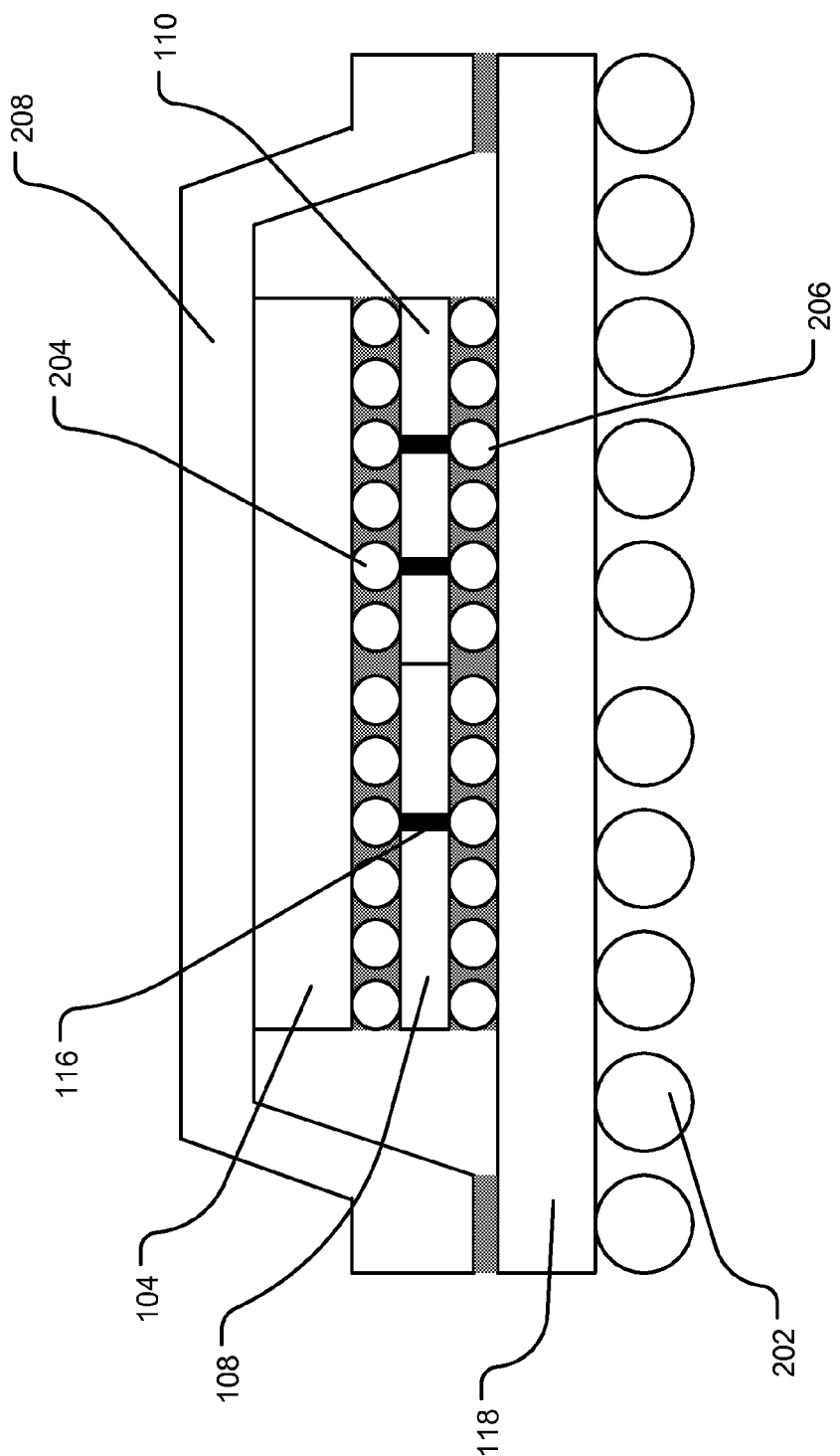
FIG. 2 is a view of an embodiment of a SERDES and integrated circuit package showing a cross section having a logic die disposed on SERDES dies and enclosed in package elements.

The logic circuits 102 may supply high speed communications where inputs/outputs may be serialized and/or deserialized to convert the inputs/outputs between serial and parallel interfaces. The logic circuits 102 may be one or more from the group including digital circuits, radio frequency circuits, application specific integrated circuit (ASIC) processors, field programmable gate arrays (FPGA), or other type of logic circuit which may employ serializing and/or deserializing of data. The logic circuits may be disposed on the logic die 104, described further below. Other elements may also be placed on the logic die along with the logic circuits including but not limited to, memory, routing pathways, through silicon vias, or SERDES circuits. The logic circuits may communicatively connect to the SERDES circuits 106 and may also communicatively connect to the package substrate 118. Referring now to FIGS. 1 and 2, the SERDES circuits 106 may communicatively connect to the SERDES circuits 106 and the package substrate 118 via wirebonds, through silicon via 116, flip chips, solder balls 204, or other type of connection which allows the logic circuits 102 to transmit and/or receive data from the SERDES circuits 106 and communicatively connect to the package substrate 118.

The logic die 104 may provide a platform on which the logic circuits 102 are located. Other elements may also be placed on the logic die 104 along with the logic circuits 106 including but not limited to, memory, routing pathways, through silicon vias, or SERDES circuits 106. The logic die 104 may be constructed from silicon or other type of semiconducting material and may be constructed using standard methods of integrated circuit manufacturing. The logic die 104 may be stacked vertically and disposed on one or more dies. In one embodiment the logic die may be stacked on the SERDES dies 108, 110, 112. The logic die 104 may also be positioned on the SERDES dies 108, 110, 112 so that the logic circuits 102 are aligned to substantially overlie the SERDES circuits 106 to which the logic circuits 102 are communicatively connected. The logic die 104 may be communicatively connected to the SERDES dies 108, 110, 112 and may be communicatively connected to the package substrate 118. Referring to FIG. 2, the logic die 104 may communicatively connect to the SERDES dies 108, 110, via solder balls 204. The logic die 104 may also communicatively connect to the package substrate by through silicon vias 116 and solder balls 206. However the logic die 104, may also communicatively connect to the SERDES dies 108, 110 and the package substrate 118 via flip chips, wirebonds, or other connection.

The SERDES circuits 106 may convert the data between serial and parallel interfaces when the data is inputted to and/or outputted from the logic circuits 102. The SERDES circuits 106 may be made up of a parallel-in-serial out block and a serial-in-parallel out block. The type of SERDES circuits 106 used may include parallel clock SERDES, embedded clock SERDES, 8b/10b SERDES, bit interleaved SER- DES, or other type of SERDES circuit. The SERDES circuits 106 may be placed on one or more dies including the SERDES dies 108, 110, 112. The SERDES circuits 106 may be communicatively connected to the logic circuits 102 and may be configured to, when in operation, transmit and/or receive data from the logic circuits 102. The SERDES circuits may also be communicatively connected to other elements including but not limited to memory, or other circuits. The SERDES circuits 106 may also be communicatively connected to the package substrate 118. Referring now to FIGS. 1 and 2, the SERDES circuits 106 may communicatively connect to the logic circuits 102 and the package substrate 118 via wirebonds, through silicon via 116, flip chips, solder balls 206, or other connection which allows the SERDES circuits 106 to transmit and/or receive data from the logic circuits 102 and communicatively connect to the package substrate 118.

The SERDES dies 108, 110, 112, may provide a platform on which the SERDES circuits 106 are located. Other elements may also be placed on the SERDES dies 108, 110, 112 along with the SERDES circuits 106 including but not limited to, memory, routing pathways, through silicon vias, or logic circuits 102. A number of SERDES dies may be used. In one embodiment, one or more SERDES dies 108, 110, 112 may be used. The SERDES die 108, 110, 112 may be constructed from silicon or other type of semiconducting material and may be constructed using standard methods of integrated circuit manufacturing. The SERDES dies 108, 110, 112, may be disposed on the package substrate 118 and may be positioned adjacent to each other in a plane. When positioned adjacent and in a plane, the SERDES dies 108, 110, 112 may have a base area. The logic die 104 may be disposed on the base area in a vertical stack. In an embodiment, the base area may be at least as large as the area of the logic die 104. Referring to FIG. 2, the SERDES dies 108, 110, may communicatively connect to the package substrate via solder balls 206. However the SERDES dies 108, 110, may also communicatively connect to the package substrate via flip chips, wirebonds, or other connection.

The SERDES dies 108, 110, 112 may have varying configurations of SERDES circuits 106 which may be identical to or distinct from each other. The varying configurations of the SERDES circuits 106 on the SERDES dies 108, 110, 112 may allow for a menu of selectable or predetermined configurations of SERDES circuits 106. For example, the SERDES die 108 may include a SERDES circuit 106 that supports 128 channels capable of transmit/receive speeds of 28 gigabytes per second (GBS), the SERDES die may include a SERDES circuit 106 that supports 64 channels capable of transmit/receive speeds of 28 GBS, and the SERDES die may include a SERDES circuit 106 that supports channels capable of transmit/receive speeds of 15 GBS. As another example, the SERDES die 108 may include a SERDES circuit 106 that supports PCI Express and the SERDES die may include 110 may include a SERDES circuit 106 that supports the Fibre Channel protocol standard.

The menu of selectable configurations of SERDES circuits may provide SERDES communications functionality for a wide variety of logic circuits 102 and decrease the complexity of customization for the logic circuits 102 and the logic die 104. An advantage of various embodiments may be that a designer of logic circuits 102 is permitted to focus on the design of logic circuits without the need to be concerned with the design of an associated SERDES, which may be selected from the menu. Another advantage of various embodiments may be that the logic circuits 102 need not use the same technology process as the SERDES circuits 106. For example, a logic circuit 102 may use a 22 nm process while a SERDES circuit may use a 32 nm process. Each configuration may be selected based on the application of SERDES circuits on the input/outputs the logic circuits 102 placed on the logic die 104.

The filler die 114 may provide additional area with the SERDES dies 108, 110, 112, where the logic die 104 may be disposed. A number of filler dies 114 may be used. In one embodiment, one filler die 114 was used. In another embodiment two filler dies 114 were used. The filler die 114 may be constructed from silicon or other type of semiconducting material and may be constructed using standard methods of die manufacturing. The filler die 104 may be placed adjacent to the SERDES dies 108, 110, 112, and in the plane to form a base area. In one embodiment, the base area may be at least as large as the area of the logic die 104. In another embodiment the base area may be smaller than the base area of the logic die 104. Through silicon vias 116 may be placed in the filler die 114 and may allow for the logic circuits 102 and the package substrate 118 to communicatively connect through the through silicon vias 116.

Referring now to FIGS. 1 and 2, the package substrate 118 may provide a material on which the SERDES dies 108, 110, 112, the filler die, and the logic die may be disposed on. The package substrate 118 may be constructed from silicon or other type of semiconducting material and may be constructed using standard methods of integrated circuit manufacturing. The package substrate may have solder balls 202 which allow for communicative connection through the package substrate to an external device. A package cap 208 may be fastened to the package substrate 118. The package cap 208 and the package substrate 118 may enclose the SERDES dies 108, 110, and the logic die 104.

Figure 3:
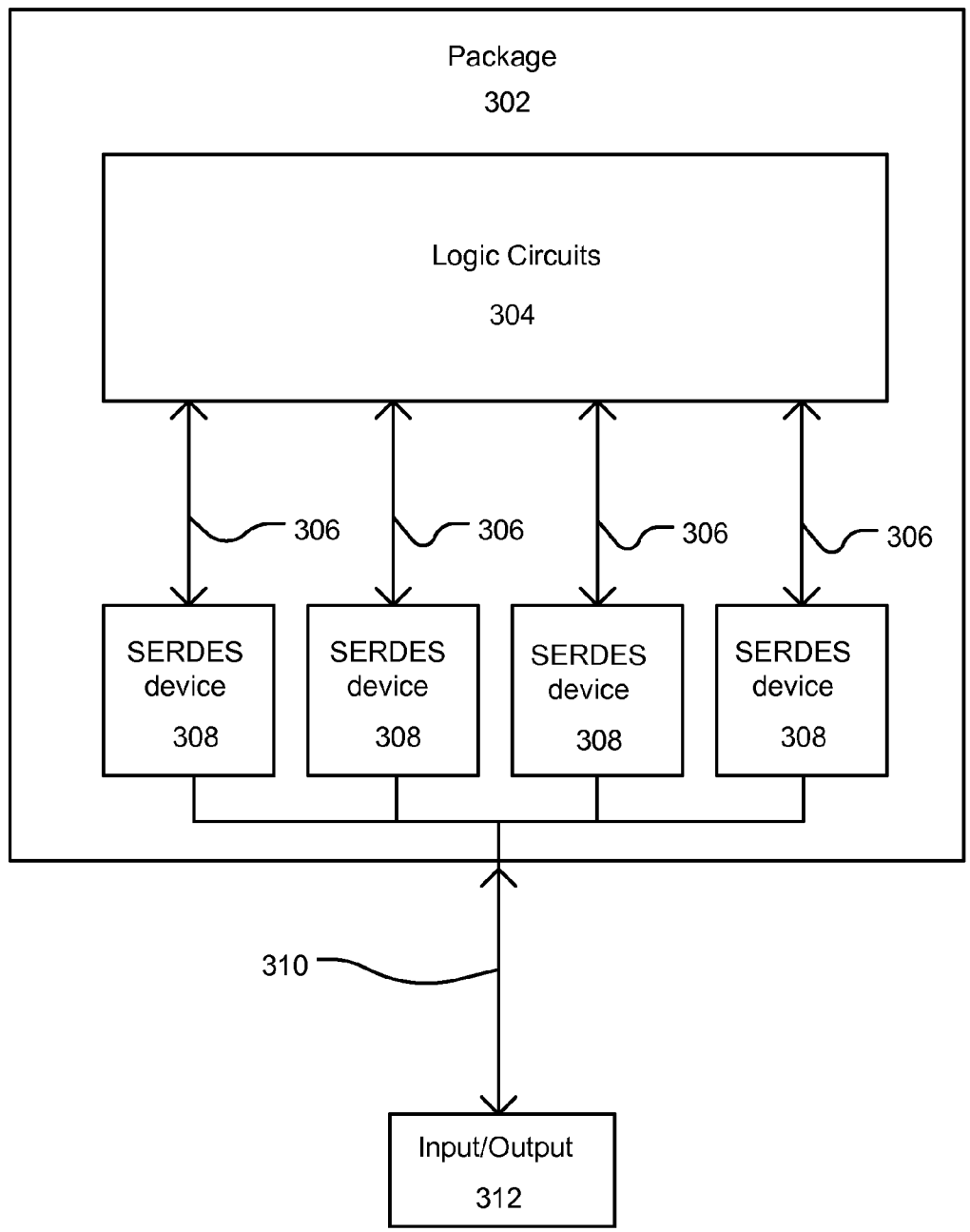
FIG. 3 is a block diagram of an embodiment of a SERDES and integrated circuit package showing the path of inputs/outputs through the logic circuits and SERDES devices.

Referring now to FIG. 3, a block diagram of an embodiment can be seen including a circuit package 302, logic circuits 304, parallel/serial buses 306, SERDES devices 308, serial bus 310, and input/outputs 312. In this embodiment, the logic circuits 304 may be substantially the same as the logic circuits 102 in FIGS. 1 and 2 and the SERDES devices may be substantially the same as the SERDES circuits 106 in FIG. 1.

In FIG. 3, an embodiment is shown where the logic circuits 304 may transmit and/or receive inputs/outputs 312 where serializing and/or deserializing may be employed to convert the inputs/outputs between serial and parallel interfaces. The logic circuits 304 may transmit the inputs/outputs 312 via the parallel/serial buses 306 to the SERDES devices 308. The SERDES devices may serialize and/or deserialize the inputs/outputs when transmitted and/or received from the logic circuits 304. The SERDES devices 308, logic circuits 304 may be contained within the package 302. The inputs/outputs may be transmitted and/or received to the package 302 via the serial buses 310 connected to the package 302.

The SERDES circuit package may also be a system for providing a logic device 308 with a SERDES device 308. The system may have a SERDES device 308, logic circuits 304, and parallel/serial buses 306 communicatively connecting the SERDES device 308 and the logic circuit, and a package 302. The SERDES device 308 may have a SERDES circuit. The system may employ multiple SERDES devices 308 each having a SERDES circuit. The parallel/serial buses 306 may include through silicon via placed in the SERDES device 308. The logic circuits 304 may be communicatively connected to the SERDES device 308 and to the package 302. The logic circuits 304 and the package 302 may communicatively connect through the through silicon via. The SERDES device 308 may be communicatively connected to the package 302 through flip chips. The SERDES device 308 may be positioned in a plane, and disposed on the package 302. The logic circuits may be positioned on a die and stacked vertically and disposed on the SERDES device 308.

Figure 4:
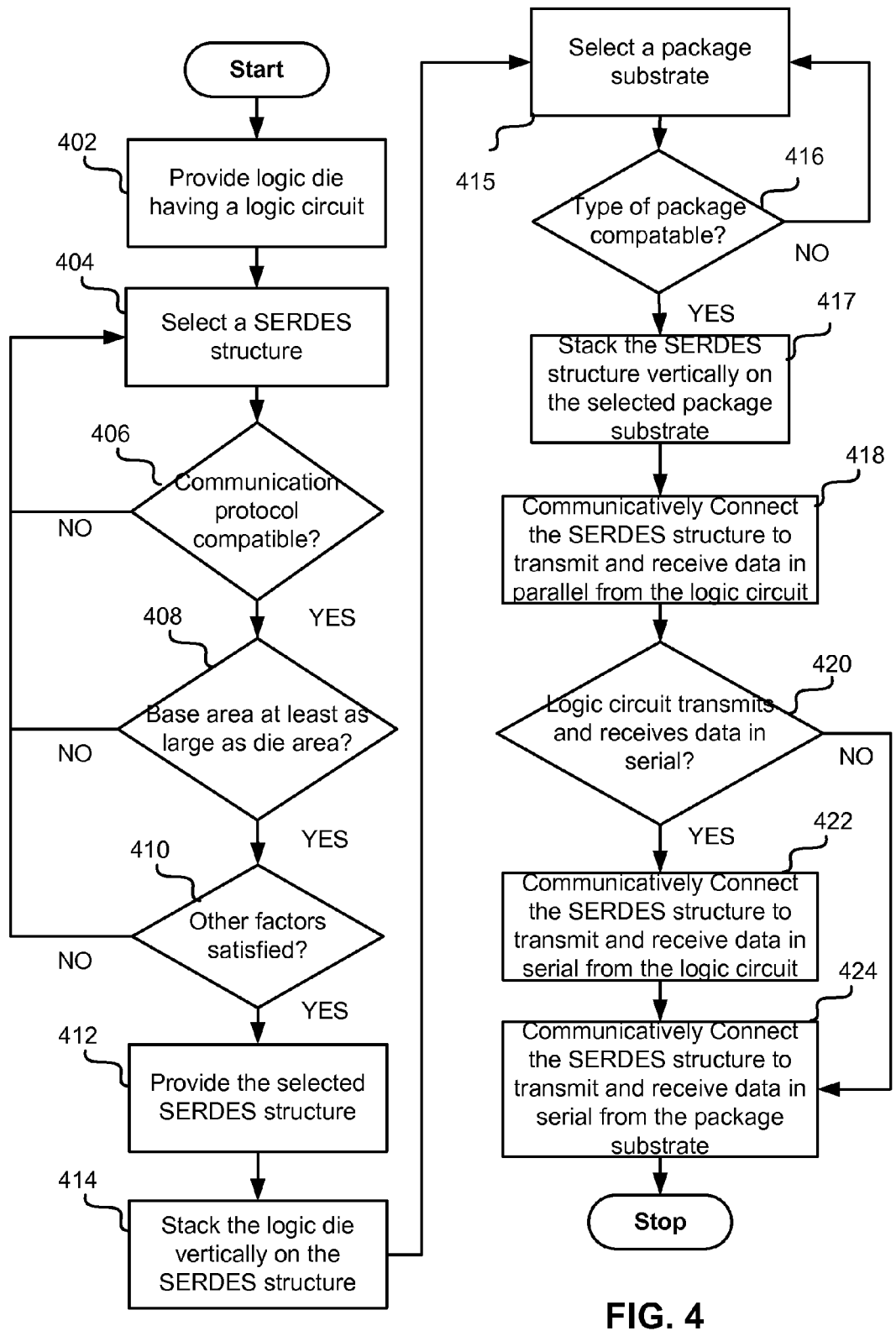
FIG. 4 is a flow diagram of a method of assembly of an embodiment of a SERDES and integrated circuit package.

FIG. 4 shows a flow diagram of an embodiment of a method 400 of assembling a SERDES and integrated circuit package. In operation 402, an assembler may provide a logic die having a logic circuit 402. The logic die and the logic circuit may be substantially the same or similar to the logic die described above and shown in at least FIGS. 1 and 2. Accordingly, the logic circuit may be one or more types of circuits selected from the group including digital circuits, radio frequency circuits, application specific integrated circuit processor, and field programmable date arrays. The logic die may also have a die area.

In operation 404 a SERDES structure may be selected from a menu of SERDES circuit and SERDES die combinations. The SERDES structure may have at least a first SERDES die having a first SERDES circuit. However, the SERDES structure may also include a second SERDES die having a second SERDES circuit, or other types of dies. The SERDES structure may have a base area, which may be the area of the at least first SERDES die positioned in a plane. The first SERDES die and the first SERDES circuit may be substantially the same or similar to first and second SERDES dies and the first and second SERDES circuits described above and shown in at least FIGS. 1 and 2.

Accordingly, the first SERDES die may include a first SERDES circuit that supports 128 channels capable of transmit/receive speeds of 28 GBS, the first SERDES die may include a first SERDES circuit 106 that supports 64 channels capable of transmit/receive speeds of 28 GBS, and the first SERDES die may include a first SERDES circuit 106 that supports channels capable of transmit/receive speeds of 15 GBS. As another example, the first SERDES die 108 may include a first SERDES circuit 106 that supports PCI Express and the first SERDES die may include a first SERDES circuit 106 that supports the Fibre Channel protocol standard. The SERDES structure may be selected from a menu of SERDES circuit and SERDES die combinations which may provide SERDES communications functionality for a wide variety of logic circuits 102 and may decrease the complexity of customization for the logic circuits 102 and the logic die 104.

The operation 404 of selecting the SERDES structure may depend on a number of factors. In an embodiment, if the SERDES structure contains SERDES circuits which are compatible with the communication protocol of the logic circuit then, in operation 406, the SERDES structure may be selected. However, if the SERDES structure does not have SERDES circuits which are compatible with the communication protocol of the logic circuit then, in operation 406, operation 404 may begin again and a different SERDES structure may be selected. In an embodiment, if the base area of the SERDES structure is at least as large as the die area of the logic die then, in operation 408, the SERDES structure may be selected. If the base area of the SERDES structure is not at least as large as the die area of the logic die then, in operation 408, operation 404 may begin again and a different SERDES structure may be selected.

In an embodiment, if the SERDES structure satisfies other factors required by the assembler then, in operation 410, the SERDES structure may be selected. These other factors may include the type of clock the SERDES circuits use, transmit and receive speeds, the manufacturer of the SERDES circuits and/or SERDES dies, or other factors depending upon the preferences of the assembler. If the SERDES structure does not satisfy other factors required by the assembler then, in operation 410, operation 404 may begin again and a different SERDES structure may be selected. In operation 412, the selected SERDES structure may be provided which may satisfy the operations 406, 408, 410, or factors of SERDES structure selection.

In operation 414, the logic die may be stacked vertically on the selected SERDES structure. In operation 415 a package substrate may be selected from a menu of possible packages. The selection of the package may depend upon a number of factors. In an embodiment, if the type of package is compatible with the selected SERDES structure and the logic circuit then, in operation 416, the package substrate may be selected. The type of package which may be compatible may include organic pin grid array package, flip chip pin grid array package, pin array cartridge package, pin grid array package, ceramic pin grid array package, or other types of packages. If the type of package is not compatible with the selected SERDES structure in the logic circuit then, in operation 416, operation 415 may begin again and a different package substrate may be selected. In operation 417 the SERDES structure may be stacked vertically on a package substrate. This is to assemble the SERDES structure and logic die into a three dimensional stack.

In operation 418, the SERDES structure may be communicatively connected to at least one of the first and second SERDES circuits to transmit and receive data in parallel from the logic circuit and to transmit and receive data in serial from a package substrate. If the logic circuit transmits and/or receives data in serial then, in operation 420, the assembly may proceed to operation 422 where the SERDES structure may also be communicatively connected to transmit and/or receives data in serial from the logic circuit. This is to communicatively connect the SERDES circuits to the logic circuits so that the SERDES circuits, when in operation, may function to serialize and/or deserialize inputs and/or outputs from the logic circuits. This communicative connection may include through silicon vias placed in the SERDES structure which may connect to the logic die. In operation 424, the SERDES structure may be communicatively connected to transmit and/or receive data in serial from the package substrate. This is to allow data to be transmitted and/or received from outside of the assembled SERDES and integrated circuit stack device. This communicative connection to the package substrate may include through silicon vias placed in the SERDES structure and which may connect to the package substrate.

Figure 5:
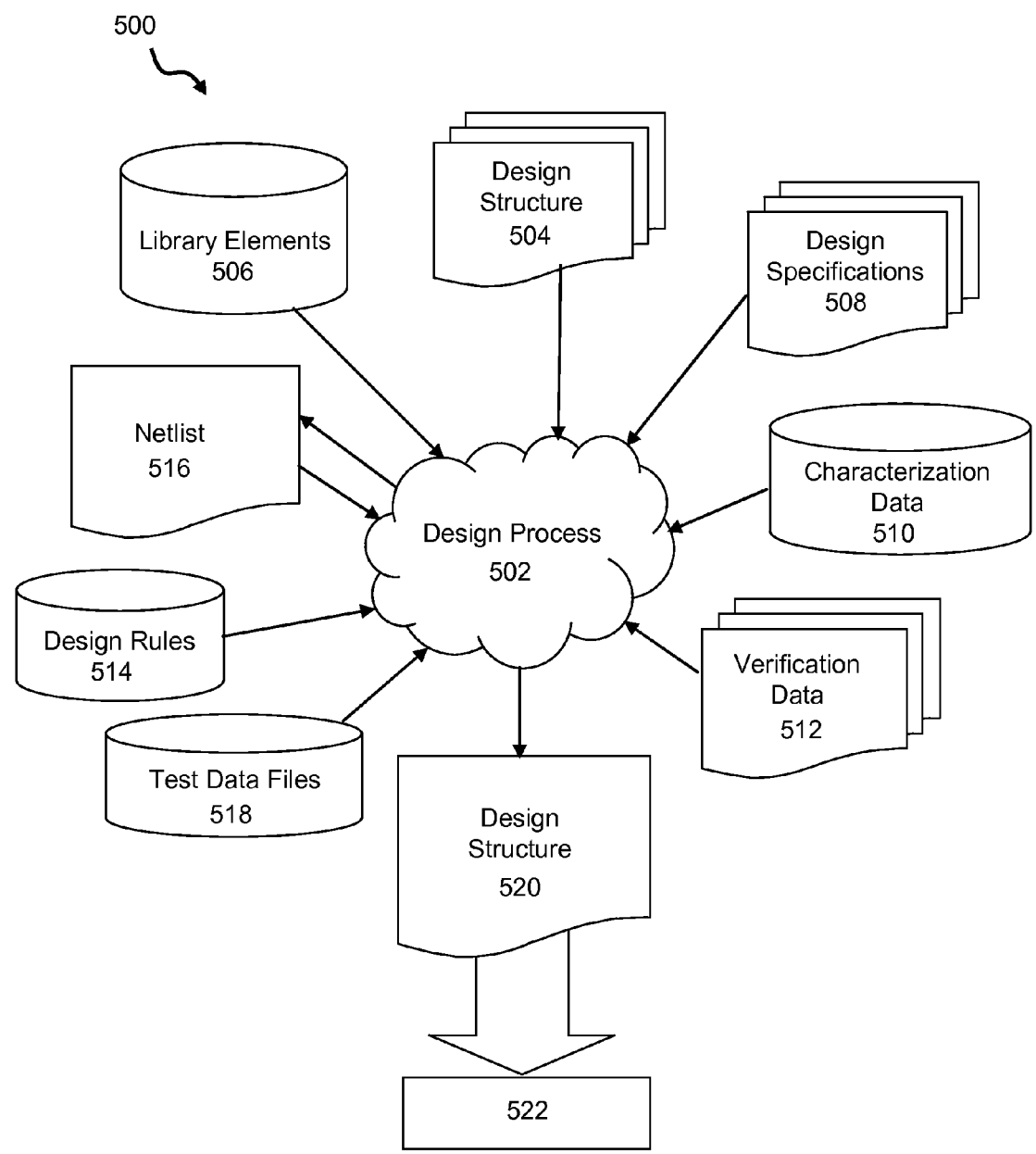
FIG. 5 is a flow diagram of a design process used in semiconductor design, manufacture, and/or test.

FIG. 5 shows a block diagram of an exemplary design flow 500 used for example, in semiconductor integrated circuit (IC) logic design, simulation, test, layout, and manufacture. Design flow 500 includes processes, machines and/or mechanisms for processing design structures or devices to generate logically or otherwise functionally equivalent representations of the design structures and/or devices described above and shown in FIGS. 1, 2, and 3.

The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 504 that is preferably processed by a design process 502. Design structure 504 may be a logical simulation design structure generated and processed by design process 502 to produce a logically equivalent functional representation of a hardware device. Design structure 504 may also or alternatively comprise data and/or program instructions that when processed by design process 502, generate a functional representation of the physical structure of a hardware device. Whether representing functional and/or structural design features, design structure 504 may be generated using electronic computer-aided design (ECAD) such as implemented by a core developer/designer.

When encoded on a machine-readable data transmission, gate array, or storage medium, design structure 504 may be accessed and processed by one or more hardware and/or software modules within design process 502 to simulate or otherwise functionally represent an electronic component, circuit, electronic or logic module, apparatus, device, or system such as those shown in FIGS. 1, 2, and 3. As such, design structure 504 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 502 preferably employs and incorporates hardware and/or software modules for synthesizing, translating, or otherwise processing a design/simulation functional equivalent of the components, circuits, devices, or logic structures shown in FIGS. 1, 2, and 3 to generate a Netlist 516 which may contain design structures such as design structure 504. Netlist 516 may comprise, for example, compiled or otherwise processed data structures representing a list of wires, discrete components, logic gates, control circuits, I/O devices, models, etc. that describes the connections to other elements and circuits in an integrated circuit design. Netlist 516 may be synthesized using an iterative process in which netlist 516 is resynthesized one or more times depending on design specifications and parameters for the device. As with other design structure types described herein, netlist 516 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 502 may include hardware and software modules for processing a variety of input data structure types including Netlist 516. Such data structure types may reside, for example, within library elements 506 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 408, characterization data 510, verification data 512, design rules 514, and test data files 518 which may include input test patterns, output test results, and other testing information. Design process 502 may further include, for example, standard mechanical design processes such as stress analysis, thermal analysis, mechanical event simulation, process simulation for operations such as casting, molding, and die press forming, etc.

One of ordinary skill in the art of mechanical design can appreciate the extent of possible mechanical design tools and applications used in design process 502 without deviating from the scope and spirit of the invention. Design process 502 may also include modules for performing standard circuit design processes such as timing analysis, verification, design rule checking, place and route operations, etc. Design process 502 employs and incorporates logic and physical design tools such as HDL compilers and simulation model build tools to process design structure 504 together with some or all of the depicted supporting data structures along with any additional mechanical design or data (if applicable), to generate a second design structure 520. Design structure 520 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures).

Similar to design structure 504, design structure 520 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2, and 3. In one embodiment, design structure 520 may comprise a compiled, executable HDL simulation model that functionally simulates the devices shown in FIGS. 1, 2, and 3.

Design structure 520 may also employ a data format used for the exchange of layout data of integrated circuits and/or symbolic data format (e.g. information stored in a GDSII (GDS2), GL1, OASIS, map files, or any other suitable format for storing such design data structures). Design structure 520 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2, and 3. Design structure 520 may then proceed to a stage 522 where, for example, design structure 520: proceeds to tape-out, is released to manufacturing, is released to a mask house, is sent to another design house, is sent back to the customer, etc.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

We claim:

1. A method of assembling a serializer-deserializer (SERDES) and integrated circuit package comprising:
    providing a logic die having a logic circuit;
    providing a SERDES structure of at least a first SERDES die having a first SERDES circuit and a second SERDES die having a second SERDES circuit, the first SERDES die and the second SERDES die discrete from one another, the first and second SERDES dies positioned adjacent in a plane, the SERDES structure selected from a menu of SERDES circuit and SERDES die combinations;
    stacking the logic die vertically on the SERDES structure and the SERDES structure vertically on a package substrate;
    communicatively connecting at least the first SERDES circuit to transmit and receive data in parallel from the logic circuit and to transmit and receive data in serial from a package substrate.

2. The method of assembling a serializer-deserializer (SERDES) and integrated circuit package according to claim 1, wherein which SERDES structure is selected from the menu is determined at least based on a communication protocol of at least the first SERDES circuit.

3. The method of assembling a serializer-deserializer (SERDES) and integrated circuit package according to claim 1, wherein the logic die has a die area, the SERDES structure has a base area, and wherein which SERDES structure is selected from the menu is determined at least based on providing a base area at least as large as the die area.

4. The method of assembling a serializer-deserializer (SERDES) and integrated circuit package according to claim 1, wherein the package substrate is selected from the menu and which package substrate is selected is determined at least based on the compatibility of the package.

* * * * *